United States Patent [19]

Workman et al.

[11] Patent Number: 5,447,035

[45] Date of Patent: Sep. 5, 1995

[54] METHOD OF TREATING BRAKE PADS

[75] Inventors: Kenneth J. Workman, Bourbon, Ind.; Dennis W. Pitts, St. Joseph, Mich.

[73] Assignee: Leading Edge, Incorporated, Bremen, Ind.

[21] Appl. No.: 315,230

[22] Filed: Sep. 29, 1994

Related U.S. Application Data

[63] Continuation-in-part of Ser. No. 47,952, Apr. 19, 1993, abandoned.

[51] Int. Cl.⁶ ............... F25D 25/00; F25D 17/02; C21D 1/62
[52] U.S. Cl. ............... 62/62; 62/64; 62/65; 62/78; 148/577
[58] Field of Search ............ 62/62, 64, 65, 78; 148/577; 188/250 B

[56] References Cited

U.S. PATENT DOCUMENTS

| | | | |
|---|---|---|---|
| 2,624,688 | 1/1953 | Svenson | 148/577 |
| 2,949,392 | 8/1960 | Willey | 148/577 |
| 3,185,600 | 5/1965 | Dullberg | 148/577 |
| 3,891,477 | 6/1975 | Lance | 62/62 |
| 4,482,005 | 11/1984 | Voorhees | 62/64 X |
| 4,739,622 | 4/1988 | Smith | 62/78 |
| 5,044,422 | 9/1991 | Lenker | 62/62 X |

*Primary Examiner*—Christopher Kilner
*Attorney, Agent, or Firm*—Baker & Daniels

[57] ABSTRACT

A method of treating vehicular brake pads to increase the wearability of the pads by allowing them to absorb and dissipate more energy with each use. The method involves a controlled thermal cycling process which lowers the temperature of the pads to about −300° F. and holding the pads at this temperature for a predetermined time. The pads are then gradually warmed to room temperature (72° F.).

11 Claims, 2 Drawing Sheets

METHOD OF TREATING BRAKE PADS

This is a continuation-in-part of U.S. Patent Application Ser. No. 08/047,952 filed on Apr. 19, 1993, now abandoned.

FIELD OF THE INVENTION

This invention relates to brake pads and will have application to a thermal cycling treatment process for brake pads and like articles.

BACKGROUND OF THE INVENTION

Controlled thermal cycling has recently been used as a treatment process for various alloy metals. The general usage of the thermal cycling process has been limited to steel alloys which normally include two or more alloying metals, namely combinations of cobalt, nickel, molybdenum, titanium, aluminum, chromium, magnesium, tungsten and vanadium. It has been found that thermal cycling of alloy metals improves the resistance of these metals to normal wear and tear. This is especially useful in the power tool field.

Recently, thermal cycling has been used to treat electrical power transmission equipment such as wires, cables, electric motors, etc. Such treatments have also been discovered to have beneficial properties when applied copper electrodes and spark plugs. These items have exhibited improved conductivity when so treated.

Orthopedic implants treated with a thermal cycling process have also exhibited higher durability and greater strength. Thermal cycling of the implants is disclosed in U.S. Pat. No. 5,044,422, owned by the assignee of this invention.

Thermal cycling processes affect the wearability of metal by four known mechanisms: Conversion of austenite to martensite; precipitation hardening which increases Rockwell hardness; formation of fine carbide particles; and residual stress relief.

SUMMARY OF THE INVENTION

The process of this invention involves the use of a thermal cycling process on vehicular brake pads. Typically, the process involves lowering the temperature of the pads to about $-300°$ F. and holding the temperature at that level for a predetermined time period. The pads are then allowed to slowly return to room temperature, about 72° F. In some cases the treated pads are gradually heated, held for a predetermined time at the elevated temperature, then allowed to gradually cool to room temperature.

Brake pads treated by the thermal cycling process of this invention exhibited improved durability during actual road use, when compared to untreated pads. It is theorized by the inventors that the thermal cycling produces a finer grain structure in the pad material. This allows more energy to be absorbed by the pad during each use which reduces heat build-up and improves wearability.

Accordingly, it is an object of this invention to provide a novel process for treating brake pads.

Another object is to provide for a brake pad treatment process which enables the pads to absorb more energy with each use.

Another object is to provide for a thermal cycling of brake pads which improves the wearability of the pads.

Other objects will become apparent upon a reading of the following invention.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to best follow its teachings.

The process of this invention involves the controlled thermal cycling of automotive brake pads. While the individual steps of this process as applied to brake pads are unique, the machinery used in the process is conventional and will not be described in the interests of clarity.

Brake pads are well-known items in the automotive industry. Recently, the composition of the conventional pad has changed, mainly for health reasons, from fibrous asbestos or other organic materials, to composite compounds, most of which include metallic copper or copper-based compounds. A typical brake pad comes affixed to a metal caliper which is connected to the vehicle wheel and serves to brake a vehicle by contacting a rotor upon depression of the vehicle brake pedal.

Each time the brake pad contacts the rotor to slow or stop the vehicle, friction causes the pad to heat up and loses material. This eventually results in the necessity of replacing the pad when it wears past a predetermined safety point. The life cycle of a typical pad is directly related to the number of uses and also to the force applied by the individual driver, among others. There is a direct correlation between increases of heat and increased wear rates.

Modern friction pads, such as those disclosed in U.S. Pat. No. 3,835,118 are composed of steel fiber, a phenylic resin, friction particles (such as sponge iron), ceramic powders, metallic powders (such as copper, iron and zinc), rubber particles, and graphite. The steel fiber may be as much as 50% of the total by weight, and acts as a matrix to support the other materials. The phenylic resin acts as a binder to bind all of the other substances together, since they are suspended within the steel fiber matrix. Friction pads that are subjected to severe usage often are subjected to temperature spikes as high as 600° F. Friction pads subjected to such severe service wear quickly. It is believed that the temperature spikes causes the phenylic resin to break down, thus causing the premature wear. Also the steel fibers used in brake pads include steel in both the austenitic and martensitic forms. It is an established fact that martensite reverts back to austenite (the softer form of steel) at temperatures over 550° F. making the material more susceptible to wear. Accordingly, it is desirable to remove heat from the friction pad as efficiently as possible.

Figure 1:
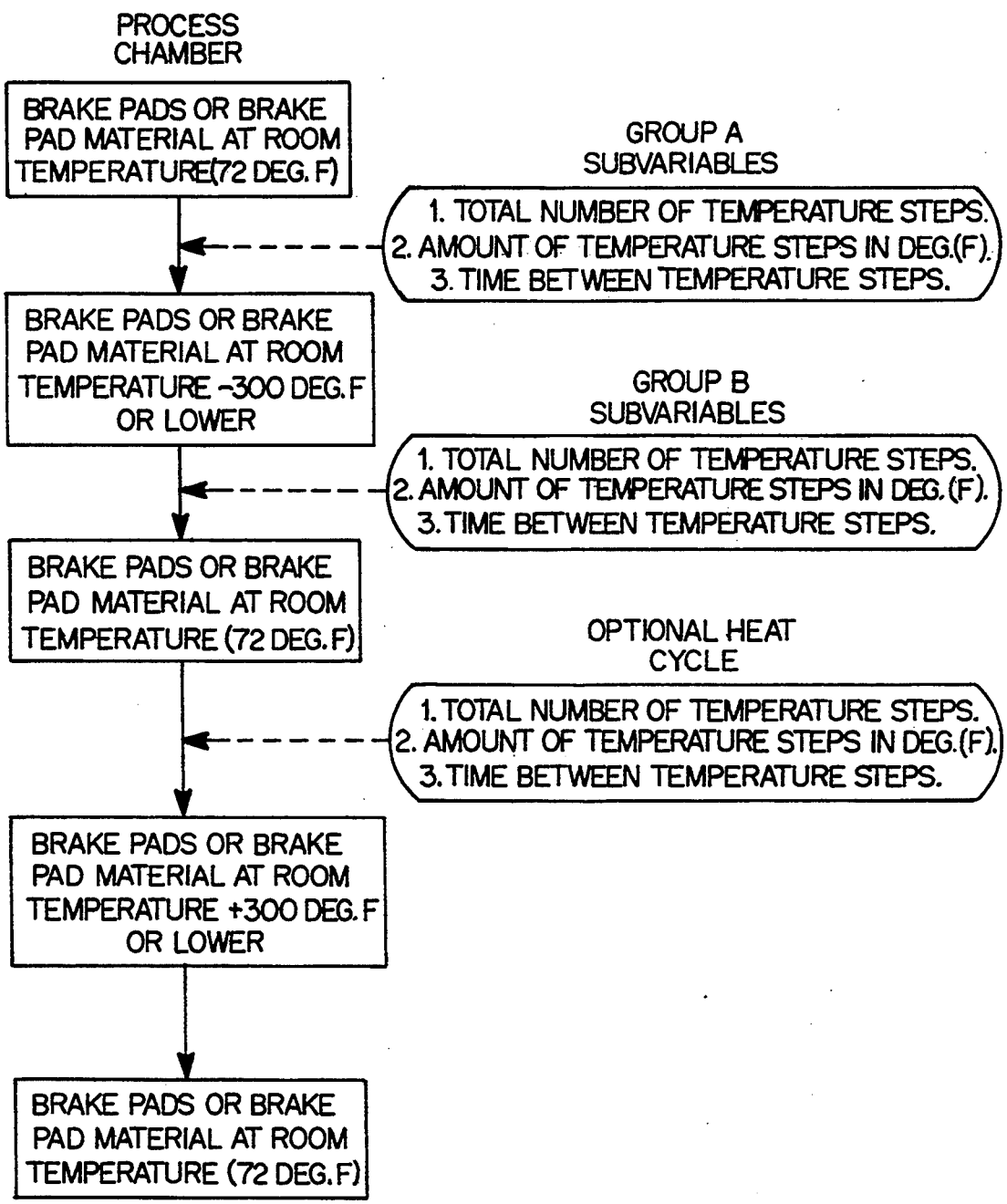
FIG. 1 is a flow chart diagram illustrating the thermal cycling process of this invention.
Figure 2:
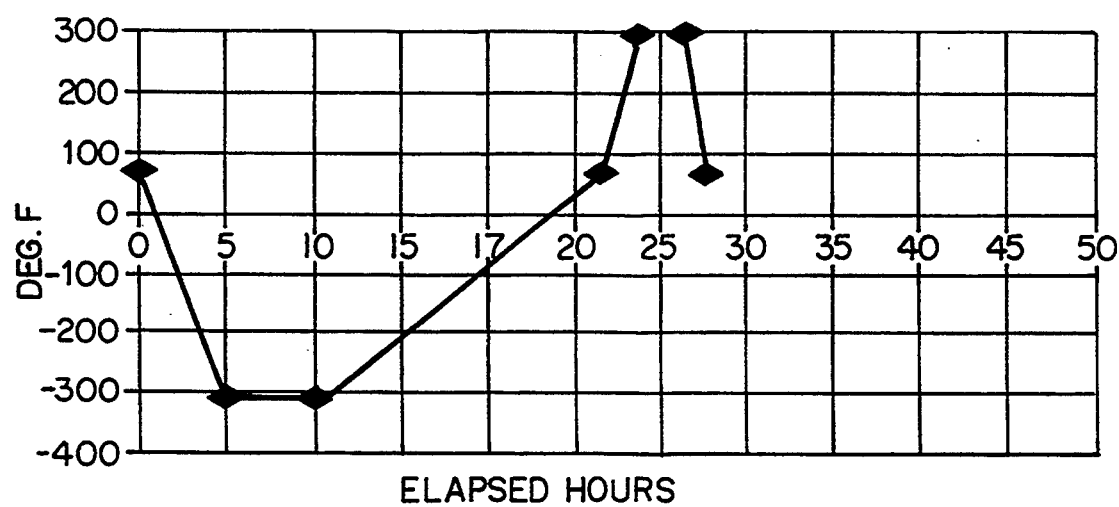
FIG. 2 is a graphical representation of the process steps as a function of temperature versus time.

It is believed that the cryogenic treatment pursuant to the present invention transforms at least some of the steel in the austenitic form to the martensitic form. It has been well documented that steel in the martensitic form has a higher coefficient of thermal conductivity than steel in the austenitic form. By having a higher percentage of the steel in the steel fibers in a form having a higher coefficient of thermal conductivity, the fibers are able to improve the transfer of heat from the friction pad to other brake and suspension structures for dissipation. It should be noted that the cryogenic treatment of pads pursuant to the present invention does not increase the overall hardness of the pad. Any such increase in hardness would be undesirable and would degrade overall braking performance. Instead, the increase pad life is attained by improving the thermal conductivity of the pad, thereby removing heat from the pad more efficiently than occurs in prior art friction pads. Other devices which have been treated with a similar cryogenic treatment, such as the orthopedic devices referred to above, are not subjected to the temperature spikes that brake friction pads are subjected to. Accordingly, any improvement in wear is not a result of improved heat dissipation since these devices are in a constant temperature environment of 96° F. The process of this invention involves placing the pads in a processing chamber and gradually lowering the temperature in the chamber to about −300° F. The pads are held in the chamber for a predetermined time, normally about twelve hours, and then gradually raised to room temperature (about 72° F.). After the pads have reached room temperature they may then be raised gradually to a temperature of about +300° F. The heated pads are held at this period for a predetermined time, usually about two hours, then allowed to cool to room temperature. The above process is performed with equipment and machinery which is conventional in the thermal cycling treatment field. First, the brake pads are placed in a treatment chamber which is connected to a supply of cryogenic fluid, such as liquid nitrogen or a similar low temperature fluid. Exposure of the chamber to the influence of the cryogenic fluid lowers the temperature until the desired level is reached. Control devices of a common nature are preferably employed to ensure gradual cooling which averts damage to the brake pads. Heating of the chamber and brake pads may also be accomplished by any well-known device. FIG. 1 illustrates the process of this invention in flow chart terms. As seen in FIG. 1, the subvariables of the cooling and optional heating phases include the total number of temperature change steps, the number of degrees changed in each step, and the time required to attain each step. Preferably, these subvariables are preselected and programmed into a common microprocessor so that the heating and cooling process are substantially linear in function as shown in FIG. 2. Linear heating and cooling ensures that the brake pads so treated receive full benefit of the treatment with limited risk of damage.

As shown in FIG. 2, the detailed steps of the process involves placing room temperature (72° F.) brake pads in the treatment chamber and gradually lowering the temperature in the chamber to about −300° F. Although any range between about −150° F. and −400° F. or lower can be used with satisfactory results, a treatment temperature close to −300° F. has been observed to produce maximum benefits. As shown in FIG. 2, cooling takes place over a period of about 8 hours, or a 46.5° drop per hour. This phase is also known as the ramp down phase of the process.

The brake pads are then held in the treatment chamber at the reduced temperature for a period of about 12 hours. This phase is also known as the soaking phase of the process.

When the soaking phase is complete, the temperature of the chamber is gradually warmed to room temperature, preferably over a period of 24 hours. This phase is also known as the ramp up phase and raises the temperature about 15.5° F. per hour.

When the brake pads have again attained room temperature, the chamber may be heated to about +300° F. Heating is generally much more rapid and the chamber and pads generally reach the upper limit in about one hour. The pads are held in the chamber at the elevated temperature for about two-hours. This is known as the heat soaking phase of the process.

Finally, when the heat soaking phase is complete, the temperature of the chamber and pads are lowered to room temperature. The cool down phase is generally achieved in about one hour. When the pads are at room temperature, they are removed from the chamber and are ready for use.

Brake pads which were treated with the above process have been field tested on state police vehicles and showed significantly reduced wear after about 10,000 miles of actual use. Similar results are expected for the pads on normal passenger and cargo hauling vehicles, as well as other vehicles.

It is understood that the invention is not limit to the details above described, but may be modified within the scope of the following claims.

We claim:

1. A method of treating vehicular brake pads to improve the wear characteristics of the pads comprising the steps of providing a brake pad having metallic fiber dispersed throughout the pad to support the components of the pad, and increasing the thermal conductivity of the fibers to improve heat dissipation during braking by gradually lowering the temperature of said brake pad to at least −300° F., holding the temperature of said brake pads at approximately −300° F. for a predetermined time, and gradually increasing the temperature of said brake pads to room temperature.

2. The method of claim 1, wherein said metallic fibers are steel fibers.

3. The method of claim 2, wherein the crystalline form of the steel fibers is changed to a form having a higher thermal conductivity.

4. The method of claim 3, wherein the steel fibers are changed from the austenitic form to the and martensitic form.

5. The method of claim 2 wherein the step of gradually lowering the temperature of the pad includes gradually lowering the temperature of said brake pads over an eight hour period.

6. The method of claim 5 wherein said brake pad is held at said temperature of −300° F. for about 12 hours.

7. The method of claim 6 wherein the step of gradually raising the temperature of said brake pad takes place over a 24 hour period.

8. The method of claim 1 and further including the steps of: gradually raising the temperature of said brake pads to about +300° F.; holding the temperature of said brake pads at about +300° F. for a predetermined time; and gradually lowering the temperature of said brake pads to room temperature.

9. The method of claim 4 wherein the temperature of said brake pad is raised to +300° F. over a one hour period.

10. The method of claim 9 wherein the temperature of said brake pads is held at 300° F. for about two hours.

11. The method of claim 10 wherein the temperature of the brake pad is lowered to room temperature over a one hour period.

* * * * *